United States Patent
Yamanaka et al.

(10) Patent No.: US 7,844,916 B2
(45) Date of Patent: Nov. 30, 2010

(54) MULTIMEDIA REPRODUCING APPARATUS AND MENU SCREEN DISPLAY METHOD

(75) Inventors: Yasuhiro Yamanaka, Chiba (JP); Shuji Hiramatsu, Tokyo (JP); Ryuji Nakayama, Tokyo (JP); Munetaka Tsuda, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 658 days.

(21) Appl. No.: 11/720,713

(22) PCT Filed: Nov. 1, 2005

(86) PCT No.: PCT/JP2005/020094

§ 371 (c)(1),
(2), (4) Date: Aug. 9, 2007

(87) PCT Pub. No.: WO2006/059450

PCT Pub. Date: Jun. 8, 2006

(65) Prior Publication Data

US 2009/0172598 A1    Jul. 2, 2009

(30) Foreign Application Priority Data

Dec. 3, 2004   (JP) .............................. 2004-352095

(51) Int. Cl.
*G06F 15/00* (2006.01)
*G06F 13/00* (2006.01)
(52) U.S. Cl. ..................................... 715/786; 715/841
(58) Field of Classification Search ......... 715/830–836, 715/786, 841, 740–742; 725/40, 53
See application file for complete search history.

(56) References Cited

U.S. PATENT DOCUMENTS

| 4,307,357 A | 12/1981 | Alm | |
| 5,898,435 A * | 4/1999 | Nagahara et al. | 715/841 |
| 6,266,098 B1 * | 7/2001 | Cove et al. | 348/563 |

(Continued)

FOREIGN PATENT DOCUMENTS

JP    54-1889    1/1979

(Continued)

OTHER PUBLICATIONS

International Search Report dated Jan. 17, 2006, from the corresponding International Application.
International Preliminary Report on Patentability and Written Opinion of the International Searching Authority dated Jun. 5, 2007, from the corresponding International Application.

(Continued)

*Primary Examiner*—Kevin Nguyen
(74) *Attorney, Agent, or Firm*—Katten Muchin Rosenman LLP

(57) ABSTRACT

In a multimedia reproducing apparatus, a read unit reads contents, content icons, and folders containing the contents from an external recording medium. A storage unit 80 stores data on a folder icon. A display processing unit processes menu screen display and content reproduction. A menu control unit switches between and displays a first level menu screen and a second level menu screen, the first menu screen displaying folder icons and content icons, the second level menu screen displaying folder icons in the state that contents are stored in folders. In the first level menu screen, a reproduction indicator is displayed near a content icon that corresponds to contents under reproduction. In the second level menu screen, the reproduction indicator is displayed near a folder icon that contains the contents.

12 Claims, 13 Drawing Sheets

FOREIGN PATENT DOCUMENTS

| | | |
|---|---|---|
| JP | 61-176807 | 11/1986 |
| JP | 2-56977 | 2/1990 |
| JP | 5-28719 | 2/1993 |
| JP | 6-37513 | 2/1994 |
| JP | 8-46413 | 2/1996 |
| JP | 9-97162 | 4/1997 |
| JP | 9-134618 | 5/1997 |
| JP | 9-167528 | 6/1997 |
| JP | 11-507786 | 7/1999 |

OTHER PUBLICATIONS

Notification of Reason(s) for Refusal dated Apr. 24, 2006, with translation, for corresponding Japanese Application No. 2006-603115.

Notification of Reason(s) for Refusal dated Oct. 2, 2007, for corresponding Japanese Application No. 2004-352095.

* cited by examiner

MULTIMEDIA REPRODUCING APPARATUS AND MENU SCREEN DISPLAY METHOD

CROSS REFERENCE TO RELATED APPLICATION

This application is a National Phase Application of International Application No. PCT/JP2005/020094, filed Nov. 1, 2005, which claims the benefit under 35 U.S.C. 119(a-e) of JP 2004-352095, filed Dec. 3, 2004, which is herein incorporated by reference.

TECHNICAL FIELD

This invention relates to a multimedia reproducing apparatus and a menu screen display method, and in particular to a user interface technology for a menu screen for instructions for multimedia reproduction.

BACKGROUND TECHNOLOGY

In recent years, use of digital home appliances such as hard disk recorders, DVD (Digital Versatile Disc) recorders, hybrid machines thereof, and digital cameras have been spreading rapidly. The prevalence of these products has not only fueled demand for the products themselves, but has also boosted demand for digital contents including motion pictures, music, and games, and is now attracting attention as an engine for driving economic recovery.

DISCLOSURE OF THE INVENTION

Many of the digital home appliances are predicated on household use in living rooms. For the sake of creating higher demand for products and contents, however, widespread use of apparatuses with which a variety of contents can be enjoyed in any location, is considered necessary. To meet such needs, it is highly desirable that the user interface of these apparatuses has operability and comfort comparable to those of digital home appliances using TV screens.

The inventor has developed the present invention in view of the foregoing problem, and a general purpose thereof is to improve the user convenience relating to multimedia reproduction.

A multimedia reproducing apparatus according to one embodiment of the present invention is an apparatus capable of reproducing digital contents, including: an operation unit which acquires a user's instruction pertaining to reproduction of contents; a search unit which searches an external recording medium loaded in this apparatus for data necessary for constituting a menu screen for searching for contents; and a menu control unit which switches between and displays a first level menu screen and a second level menu screen according to a user's selection, the first level menu screen displaying a folder icon and a content icon corresponding to contents unfolded from that folder, the second level menu screen displaying a folder icon in the state that contents are contained in a folder.

Then, the menu control unit displays a reproduction indicator near a content icon that corresponds to contents being reproduced by this apparatus when the first level menu screen is displayed, and displays the reproducing indicator near a folder icon corresponding to a folder that contains the contents being reproduced by this apparatus when the second level menu screen is displayed, the reproduction indicator indicating that the contents are under reproduction.

The "digital contents" and "contents" refer to information contents including moving image data, sound data, photographic data, text data, and program data to be reproduced, displayed, or executed through a plurality of types of information transmitting means. In particular, information for entertainment purposes such as motion pictures, photographs, music, and games created in the form of digital data may be included. The "external recording medium" may be a removable recording medium such as an optical disk and a memory card. Moreover, the "reproducing" includes displaying digital photographic data upon the multimedia reproducing apparatus, aside from reproducing moving image data and sound data.

According to the present embodiment, the menu screen of the apparatus for reproducing contents not only displays the reproduction indicator in the level where content icons are displayed, but also displays the reproduction indicator on the folder icon of a folder that contains the contents under reproduction, even in a higher level where no content icon is displayed. The user can thus easily recognize where the contents being reproduced by the multimedia reproducing apparatus is located in a directory. This improves the user operability when reproducing an external recording medium having a directory configuration.

As employed herein, the "folder" includes a root folder when the contents are stored in the root directory of the external recording medium. If there is a plurality of levels of folders, the folders in the second and subsequent levels are also included.

Another embodiment of the present invention is a method of making an apparatus capable of reproducing digital contents display a menu screen for searching for contents. This method includes: searching an external recording medium loaded in this apparatus for data necessary for constituting the menu screen; switching between and displaying a first level menu screen and a second level menu screen according to a user's instruction, the first level menu screen displaying a folder icon and a content icon corresponding to contents unfolded from that folder, the second level menu screen displaying a folder icon in the state that contents are contained in a folder; displaying a reproduction indicator near a content icon corresponding to contents being reproduced by the apparatus when the first level menu screen is displayed, the reproducing indicator indicating that the contents are under reproduction; and displaying the reproduction indicator near a folder icon corresponding to a folder that contains the contents being reproduced by the apparatus when the second level menu screen is displayed.

Even in this embodiment, the menu screen of the apparatus for reproducing contents not only displays the reproduction indicator in the level where content icons are displayed, but also displays the reproduction indicator on the folder icon of a folder that contains the contents under reproduction, even in a higher level where no content icon is displayed. The user can thus easily recognize where the contents being reproduced by the content reproducing apparatus is located in a directory.

Yet another embodiment of the present invention also relates to a multimedia reproducing apparatus. This apparatus includes: an operation unit which acquires a user's instruction pertaining to reproduction of contents; a search unit which searches an external recording medium loaded in this apparatus for data necessary for constituting a menu screen for searching for contents; and a menu control unit which switches between and displays a first level menu screen and a second level menu screen according to a user' selection, the first level menu screen displaying a folder icon and a content icon corresponding to contents unfolded from that folder, the second level menu screen displaying a folder icon in the state that contents are contained in a folder. Then, the menu control unit displays a content icon that corresponds to contents being reproduced by this apparatus in a mode different from that of other content icons when the first level menu screen is displayed, and displays a folder icon corresponding to a folder that contains the contents being reproduced by this apparatus in a mode different from that of other folder icons when the second level menu screen is displayed.

As employed herein, displaying an icon in a mode different includes: displaying the icon with brightness, saturation, hue, or the like that is different from that of the other icons; changing the size of the icon; and blinking, rotating, or vibrating the icon during display. Even in this embodiment, the user can easily recognize where the contents being reproduced by the multimedia reproducing apparatus is located in a directory.

EFFECTS OF THE INVENTION

According to the present invention, it is possible to improve the user convenience of the interface for giving an instruction for multimedia reproduction.

THE BEST MODE FOR CARRYING OUT THE INVENTION

A multimedia reproducing apparatus according to one embodiment of the present invention is a portable hybrid apparatus capable of reproducing or executing a plurality of types of contents such as still images, moving images, music, and games. This apparatus has a small, built-in liquid crystal display panel. On-screen display, a cross key, and various types of keys are used as operation means. When reproducing a plurality of types of contents on a computer, it is typically the case that separate programs, such as a viewer or the like, are used for the individual contents depending on their respective types. These separate programs are created by different respective vendors, and usually have no common interface or integrated method of operations.

The multimedia reproducing apparatus according to the present embodiment integrates the reproduction of a plurality of types of contents under a common interface, and provides common operability to the user. Furthermore, in a menu screen, instead of displaying a plurality of types of contents stored in a plurality of recording media all at once, menu images and icons for suggesting the details of the contents are displayed with respect to each content type and each recording medium. Specifically, icons that represent respective reproducing functions such as moving-image reproduction, photograph reproduction, music reproduction, and game execution are displayed in a horizontal direction; and icons that represent the types of recording media such as an optical disk and a memory card and the details of contents stored therein are displayed in respective vertical directions, thereby constituting a menu screen. This makes it possible for the user to search for and select desired contents easily within a relatively small screen. Moreover, by provision of the interface realizing a view that is appealing to the intuition of users as well as providing simple operability, the user's convenience may be improved.

Figure 1:
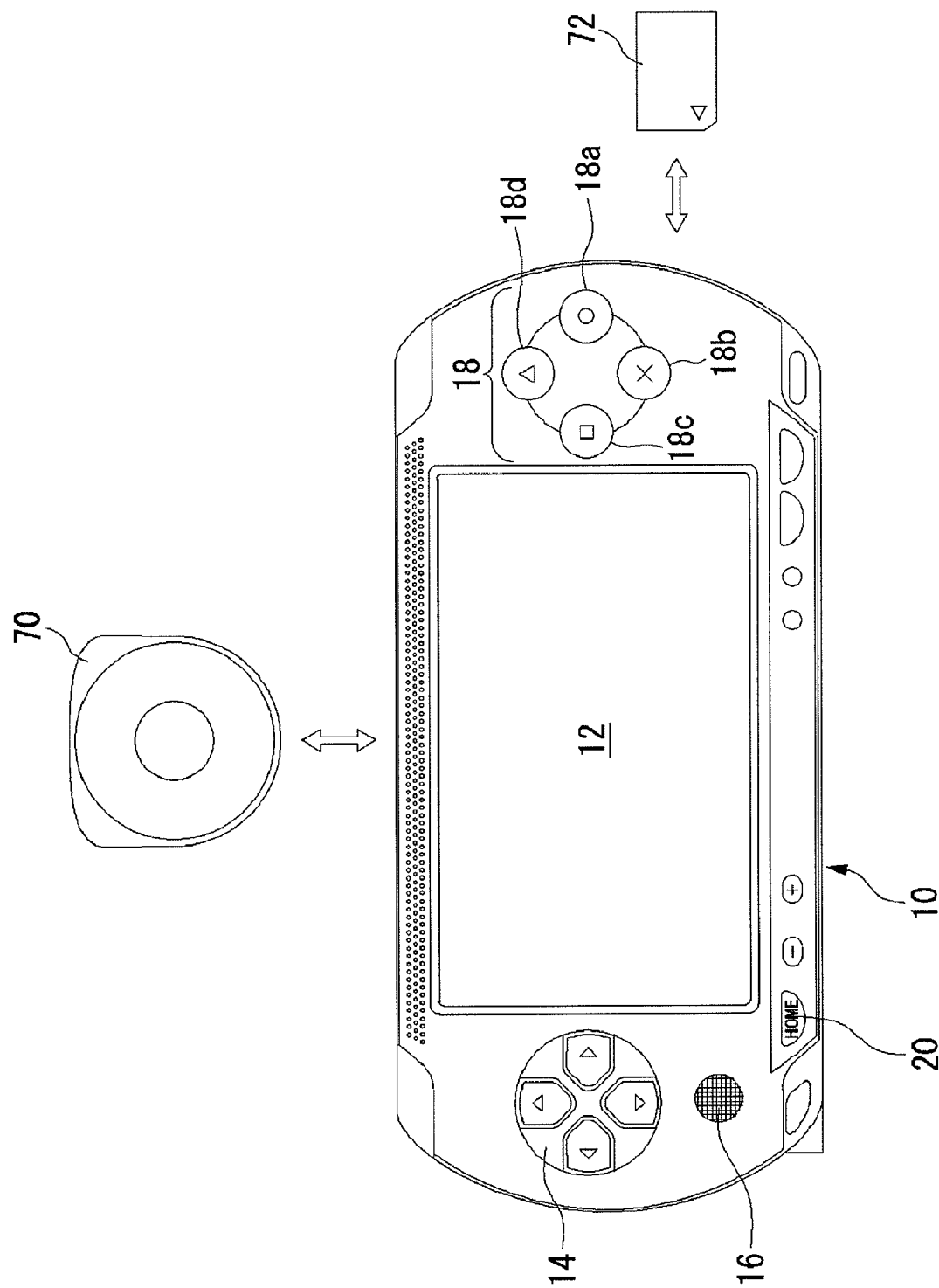
FIG. 1 is a diagram showing the appearance of a multimedia reproducing apparatus.

FIG. 1 shows the appearance of the multimedia reproducing apparatus. The multimedia reproducing apparatus 10 is an electronic portable type device, and is capable of reproducing digital contents such as moving images, still images, and music, and executing contents such as a game program. The contents are read mainly from external recording media which are removably attached to the multimedia reproducing apparatus 10. The external recording media in the present embodiment are a small optical disk 70 and a memory card 72. The small optical disk 70 and the memory card 72 are loaded into a not-shown drive unit which is provided in the multimedia reproducing apparatus 10, respectively. The small optical disk 70 is a read-only optical disk which is composed of an optical disk having a diameter smaller than that of a CD-ROM and DVD-ROM, accommodated in a protective cartridge, and has a storage capacity of several gigabytes. This small optical disk 70 is capable of storing moving image data of relatively large data size, such as a motion picture, as well as music data and still image data. The memory card 72 is a small memory card that can also be removably attached to digital cameras and cellular phones, and is capable of storing still image data, moving image data, sound data, and other data of relatively small data size.

The multimedia reproducing apparatus 10 is provided with a liquid crystal display 12 and keys such as arrow keys 14, an analog stick 16, button keys 18, and a home button 20. The button keys 18 consist of four buttons 18a, 18b, 18c, and 18d which have circle, cross, square, and triangle figures stamped or printed on the tops of their key pads. A user holds the right and left ends of the multimedia reproducing apparatus 10 with both hands, respectively. The user gives instructions to the up, down, right, or left by using the arrow keys 14 or the analog stick 16 mainly with the left thumb, and gives various types of interactions using the button keys 18 mainly with the right thumb. Unlike the arrow keys 14 and the button keys 18, the home button 20 is located in a position where it is difficult to be pressed with any of the thumbs and fingers when the right and left ends of the multimedia reproducing apparatus 10 are held with both hands, respectively, thereby avoiding wrong operation. The liquid crystal display 12 displays a menu screen for a graphical user interface to be described in FIG. 3 and later, and the reproduction screens of the contents. The multimedia reproducing apparatus 10 also includes a USB port, an infrared port, and wireless LAN communication facilities, and transmits and receives data to/from other apparatuses through these ports or communication facilities.

Figure 2:
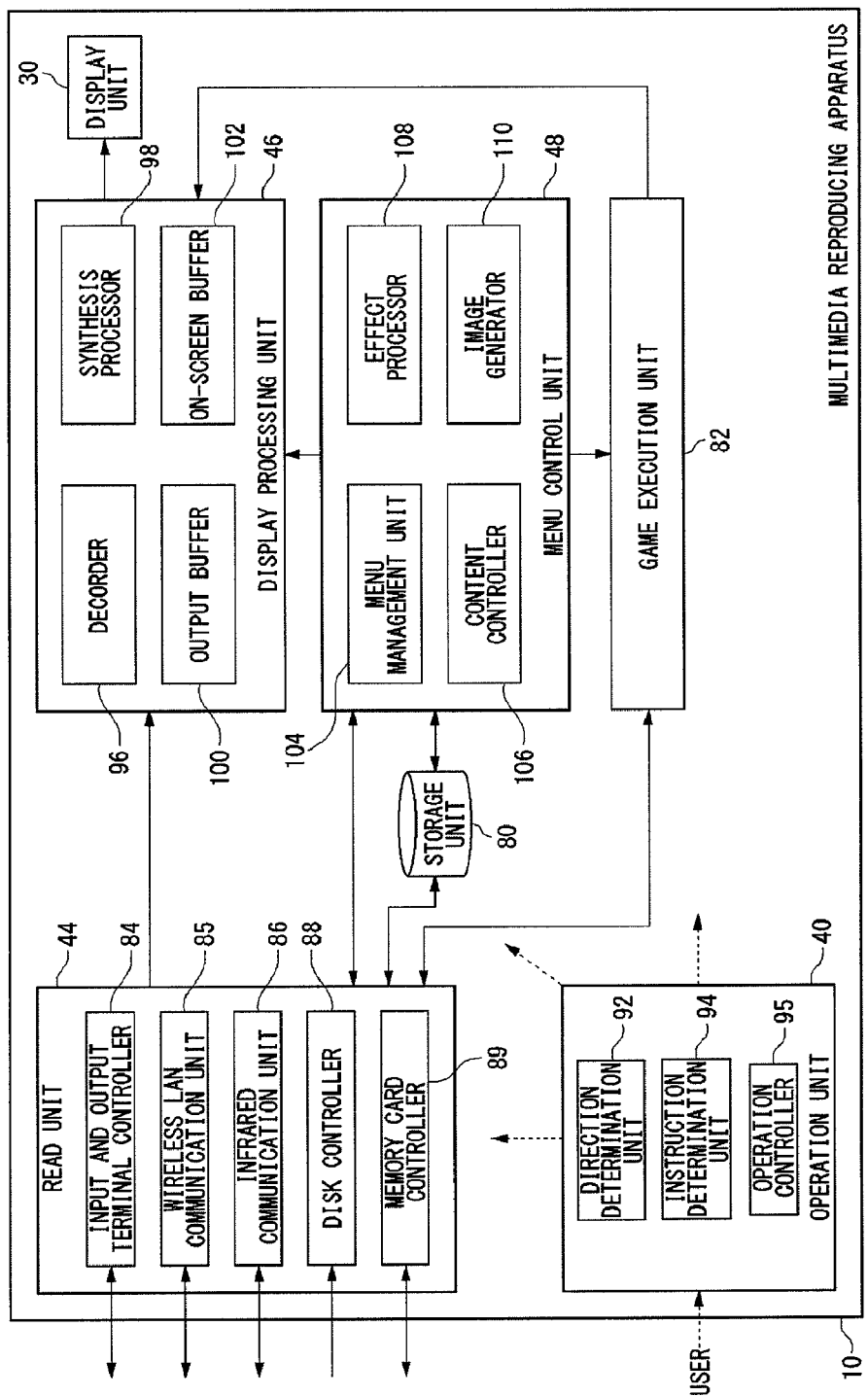
FIG. 2 is a functional block diagram showing the configuration of the multimedia reproducing apparatus.

FIG. 2 is a functional block diagram showing the configuration of the multimedia reproducing apparatus. The multimedia reproducing apparatus 10 includes an operation unit 40, a read unit 44, a display processing unit 46, a menu control unit 48, a display unit 30, a storage unit 80, and a game execution unit 82. In terms of hardware, the multimedia reproducing apparatus 10 can be achieved by such components as a CPU, a RAM, a ROM, and a drawing circuit. In terms of software, the multimedia reproducing apparatus 10 can be achieved by a program which provides such functions as a data input function, a data retaining function, an image processing function, and a drawing function. FIG. 2 shows the functional blocks to be achieved by the cooperation of these. These functional blocks can thus be practiced in various forms of combinations of hardware and software. The individual components are controlled based on user operations input through the operation unit 40.

The operation unit 40 includes a direction determination unit 92, an instruction determination unit 94, and an operation controller 95, and acquires instructions as to content reproduction through user operations. The direction determination unit 92 acquires instructions as to directions to the up, down, right, or left which are input by the user through the arrow keys 14 or the analog stick 16. The instruction determination unit 94 acquires instructions such as start reproduction, stop reproduction, settle a selection, cancel a selection, and call up a menu screen, which are input by the user through the button keys 18 and the home button 20. In particular, each time the home button 20 is pressed, the instruction determination unit 94 acquires the instruction of the pressing as an instruction to switch between the displaying of a menu screen and a content reproduction screen. This will be further described later with reference to FIG. 13. Moreover, when the instruction determination unit 94 acquires an instruction to end the reproduction or execution of contents, it recognizes that an instruction to return to the menu screen is given at the same time. The direction determination unit 92 and the instruction determination unit 94 are composed of a combination of a plurality of buttons, a circuit for detecting depression of the buttons, a program for recognizing the detection, and the like.

The operation controller 95 controls each of the read unit 44, the display processing unit 46, the menu control unit 48, the game execution unit 82, and the display unit 30 in accordance with instructions acquired by the direction determination unit 92 and the instruction determination unit 94. The display unit 30 displays the menu screen and the reproduction screens of contents on the liquid crystal display 12.

The read unit 44 includes an input and output terminal controller 84, a wireless LAN communication unit 85, an infrared communication unit 86, a disk controller 88, and a memory card controller 89. The read unit 44 mainly reads contents from external recording media which are loaded as areas which contain contents data to be reproduced. The disk controller 88 reads contents such as a motion picture and music from the small optical disk 70. The memory card controller 89 reads images, music, and other contents from the memory card 72, and writes data such as saved data from a game program to the memory card 72. The input and output terminal controller 84 inputs and outputs data from/to other apparatuses that are connected via a USB. The wireless LAN communication unit 85 transmits and receives data to/from other apparatuses through wireless LAN communications such as an IEEE 802.11a/b/g. The infrared communication unit 86 transmits and receives data to/from other apparatuses through infrared communications such as an IrDA.

The disk controller 88 and the memory card controller 89 read menu images of contents from the small optical disk 70 or the memory card 72 in advance of a content reproduction instruction from the user. As employed herein, menu images are images that visually show outlines of the contents, including such outlines as a title, data size, play time, production date, content description, and thumbnail images. Menu images are created according to a predetermined rule as to image size, and are composed of a foreground image which visually expresses the outlines of the contents and a background image which is used as a background. Note that either one of the foreground image and the background image may be stored alone in the small disk 70 or in the memory card 72 as a menu image, or a plurality of images may be stored as foreground images or background images, depending on the decision of the content creators.

The disk controller 88 and the memory card controller 89 read content icons, which represent contents, from the small optical disk 70 or the memory card 72 in advance of receiving a content reproduction instruction from the user. Content icons are expressed by graphics or figures that represent the contents for the sake of distinction from other contents. Moving image icons created in a moving image format and still image icons created in a still image format are both included. The disk controller 88 and the memory card controller 89 may also generate thumbnails from images included in the contents stored in the small optical disk 70 or in the memory card 72, and acquire the thumbnails as content icons.

The input and output terminal controller 84, the wireless LAN communication unit 85, and the infrared communication unit 86 acquire menu images and content icons of contents from other apparatuses as do the disk controller 88 and the memory card controller 89, when the apparatuses are connected to the multimedia reproducing apparatus 10 through a USB, a wireless LAN communication, or an infrared communication.

The storage unit 80 retains data on a plurality of function icons, data on a plurality of medium icons, and data on a folder icon. The plurality of function icons represents the types of a plurality of reproducing functions for reproducing different types of contents, respectively. The plurality of medium icons represents the types of external recording media that can be loaded into the multimedia reproducing apparatus 10. The folder icon represents a folder in a directory structure within which contents are stored in external recording media. The function icons retained in the storage unit 80 include an icon that represents a photograph reproducing function, an icon that represents a music reproducing function, an icon that represents a moving image reproducing function, an icon that represents a game execution function, and icons that represent various setting functions. For medium icons, an icon that represents the small optical disk 70 and an icon that represents the memory card 72 are retained in the storage unit 80. The storage unit 80 also retains content icons read by the read unit 44, content icons created from contents read by the read unit 44, and a common content icon which is prepared for contents whose corresponding content icons are not acquired.

The display processing unit 46 includes a decoder 96, a synthesis processor 98, an output buffer 100, and an on-screen buffer 102. In particular, the display processing unit 46 processes the displaying of a menu screen pertaining to content reproduction and the reproduction or execution of contents read from recording media. The decoder 96 decodes coded data such as moving image data, still image data, and sound data which are read from external recording media such as the small optical disk 70 and the memory card 72, based on user instructions acquired by the operation unit 40. In particular, when encrypted data is stored in the small optical disk 70 or the memory card 72, the decoder 96 also processes the decryption of the encrypted data. The decoder 96 stores the decoded reproduction data into the output buffer 100. The output buffer 100 stores the reproduction data temporarily before transmitting the reproduction data to the display unit 30. The on-screen buffer 102 stores image data intended for on-screen display temporarily before outputting the image data to the display unit 30. An example of the image data intended for on-screen display is image data on the menu screen generated by the menu control unit 48. It should be appreciated that the output buffer 100 and the on-screen buffer 102 may be physically made of a single buffer memory or separate buffer memories.

The synthesis processor 98 synthesizes the reproduction data stored in the output buffer 100 and the image data intended for on-screen display, stored in the on-screen buffer 102 and transmits the same to the display unit 30. The display unit 30 displays the data transmitted from the synthesis processor 98 on the liquid crystal display 12.

The menu control unit 48 includes a menu management unit 104, a content controller 106, an effect processor 108, and an image generator 110, and generates image data on the menu screen. The menu management unit 104 manages the types of the reproducing functions and the types of the recording media as menu items. The menu management unit 104 memorizes content items read from the small optical disk 70 or the memory card 72, and memorizes the type of reproducing function, the type of recording medium, directory structure, and content item which are selected currently. It also memorizes the correspondence between the contents stored in the respective recording media and the functions for reproducing the contents. For example, when the small optical disk 70 loaded into the apparatus 10 contains contents corresponding to the moving image reproducing function and contents corresponding to the music reproducing function, the menu management unit 104 memorizes the correspondence between the functions, the recording medium, and the respective contents.

The content controller 106 controls the start of the read of contents from external recording media and the start of reproduction or execution of the contents based on user instructions acquired by the operation unit 40. The effect processor 108 processes icon actions on the menu screen. For example, it processes such actions as scrolling, zoom-in, and zoom-out of each icon, and processes its reproduction if the icon is a moving image icon.

The image generator 110 generates image data on the menu screen in which a plurality of function icons and one or more medium icons are arranged in a two-dimensional fashion, based on user instructions acquired by the operation unit 40. For example, the image generator 110 arranges the plurality of function icons in a horizontal direction and the medium icons in a vertical direction. These two arrays intersect each other near the approximate center of the screen, and the image generator 110 visually emphasizes this intersection as well as a function icon and a medium icon displayed nearby as focus targets. As will be described later, when a medium icon is selected and settled on by the user, the image generator 110 generates a menu screen in which folder icons, representing folders contained in the corresponding medium, are arranged in a vertical direction. Moreover, when a folder icon is selected and settled on by the user, the image generator 110 generates a menu screen in which content icons, representing contents contained in the corresponding folder, are arranged in the vertical direction. As with function icons and medium icons, a folder icon or content icon that is selected and settled on by the user is displayed near the approximate center of the screen and is also visually emphasized as a focus target. As detailed above, icons to be focused on are always displayed near the approximate center of the screen irrespective of the types of the icons. The user can thus switch between directory levels and the like with minimum movement of the view. The image data on the menu screen generated by the image generator 110 is transmitted to the on-screen buffer 102.

The effect processor 108 scrolls the array of function icons horizontally according to user instructions when the direction determination unit 92 acquires instructions to the right or left, and scrolls the array of medium icons vertically when the direction determination unit 92 acquires instructions to the up or down. It should be appreciated that vertical scrolling will not occur when only a single medium icon is displayed. Moreover, if the instruction determination unit 94 acquires an instruction to settle a selection when a medium icon is highlighted, the effect processor 108 newly displays the folder icons of folders contained in the corresponding medium on the menu screen. Similarly, if the instruction determination unit 94 acquires an instruction to settle a selection when a folder icon is highlighted, the effect processor 108 newly displays the content icons of contents contained in the corresponding folder on the menu screen. For folder icons and content icons, the array of folder icons or content icons is scrolled vertically when the direction determination unit 92 acquires instructions to the up or down. The display and arrangement of the individual icons will be detailed later with reference to FIGS. 3 to 11.

The icons are scrolled while the intersection between the horizontal array and the vertical array is fixed to the predetermined position. Since the intersection of the two icon arrays is thus fixed to the predetermined position on-screen and the icons to be focused on is displayed in the same position all the time, the user need not move the view much. This also makes it easy to grasp the overall picture of a large number of contents visually. The effect processor 108 processes the highlighting of function icons and medium icons to be focused on. The highlighting of an icon is effected by providing a mode different from that of the other icons, such as displaying it in coloring different from that of the other icons and changing the same, or enlarging the icon and showing the transition.

The image generator 110 arranges menu images read from the external recording medium corresponding to the highlighted medium icon, folder icon, or content icon in the vicinity of the highlighted medium icon, folder icon, or content icon before receiving a content reproduction instruction from the user. This allows the user to recognize the free space of the medium, the name of the folder, or the outline of the contents without undertaking additional operations. The image generator 110 generates image data on the menu screen so that the menu images merge with the arrays of icons. For example, if the menu screen is composed of a foreground image and a background image, the image generator 110 overlays the arrays of icons on the background image, and overlays the foreground image thereon. This makes it possible to merge the foreground image, the background image, and the icon arrays visually without any interference therebetween.

The image generator 110 arranges content icons read from the external recording medium at or near the position of the medium icon. The game execution unit 82 executes a game program which is read from the small optical disk 70 or from the memory card 72 by the disk controller 88 or the memory card controller 89. The game execution unit 82 processes the operation of the game program based on user instructions acquired by the operation unit 40, and transmits game images and sound to the display unit 30.

Figure 3:
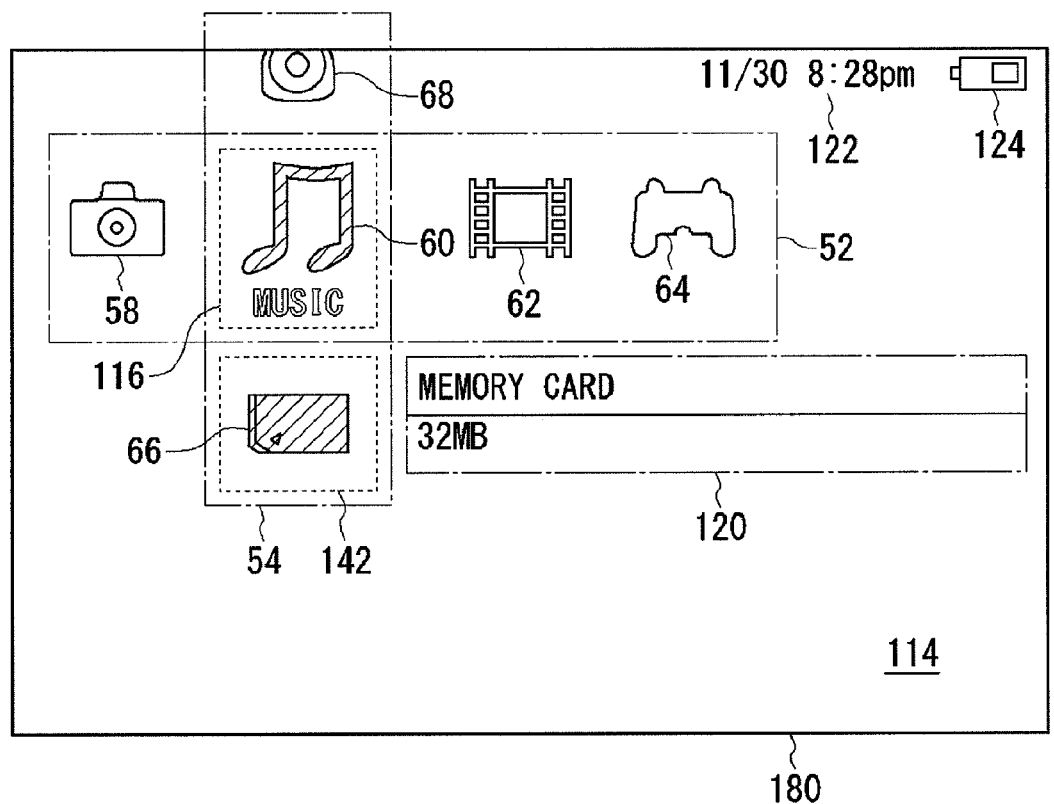
FIG. 3 is a diagram showing an example of a medium level of a menu screen in which function icons and medium icons are displayed.
Figure 4:
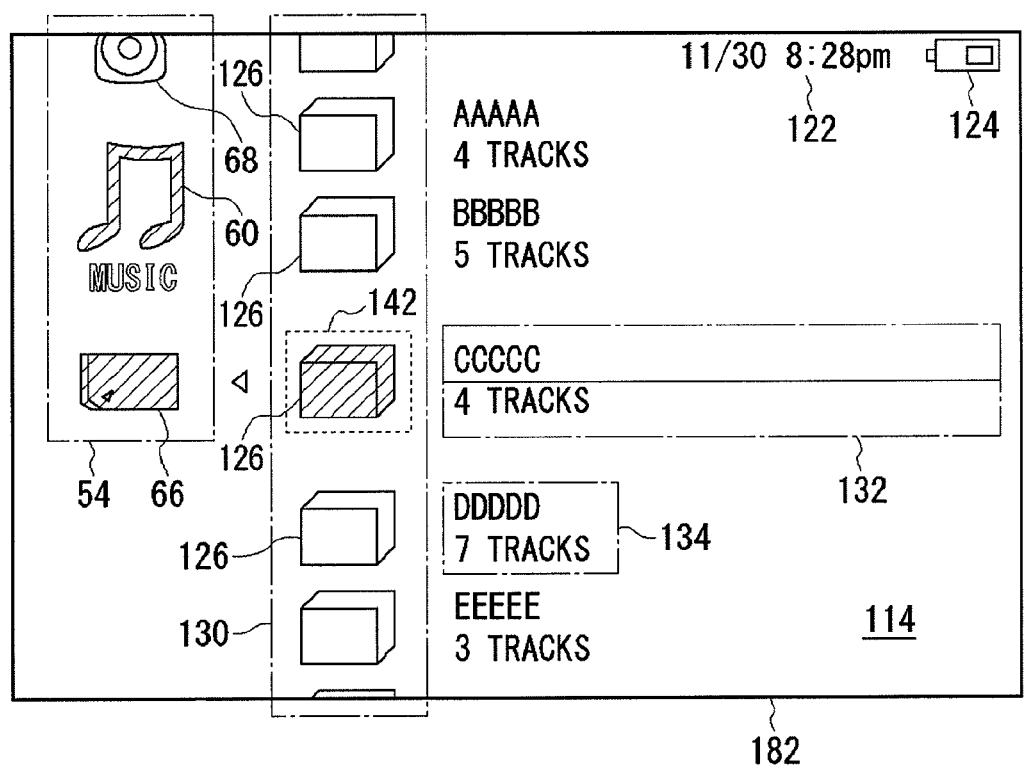
FIG. 4 is a diagram showing an example of a folder level of the menu screen in which a plurality of folder icons unfolded from a medium icon are displayed.
Figure 5:
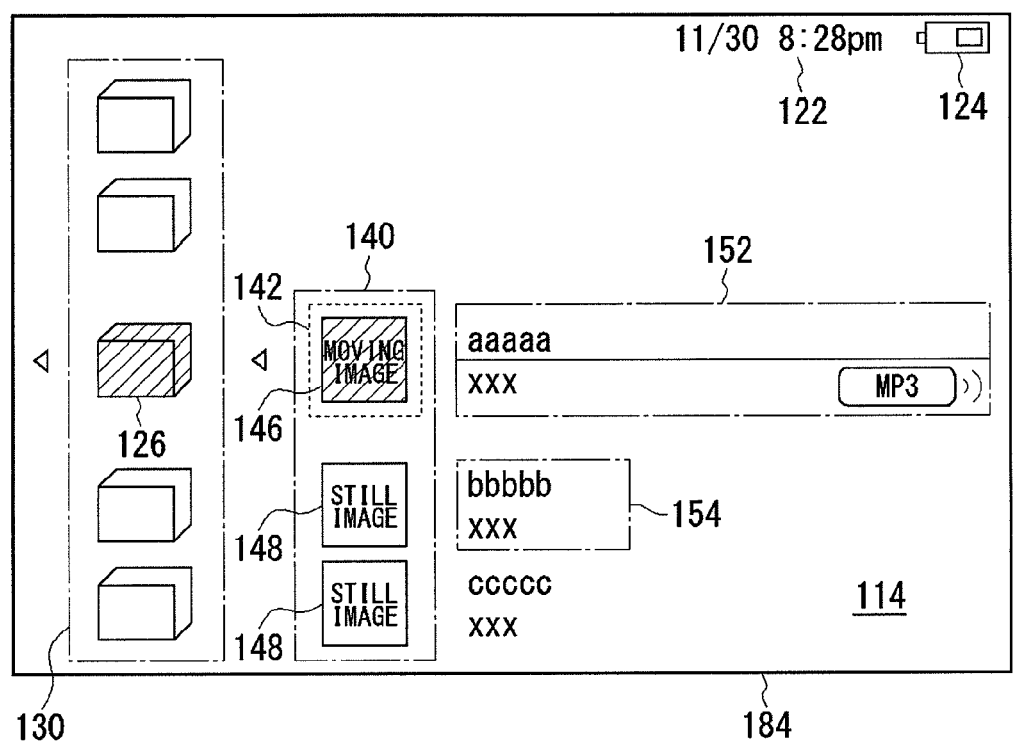
FIG. 5 is a diagram showing an example of a content level of the menu screen in which a plurality of content icons unfolded from a folder icon is displayed.
Figure 6:
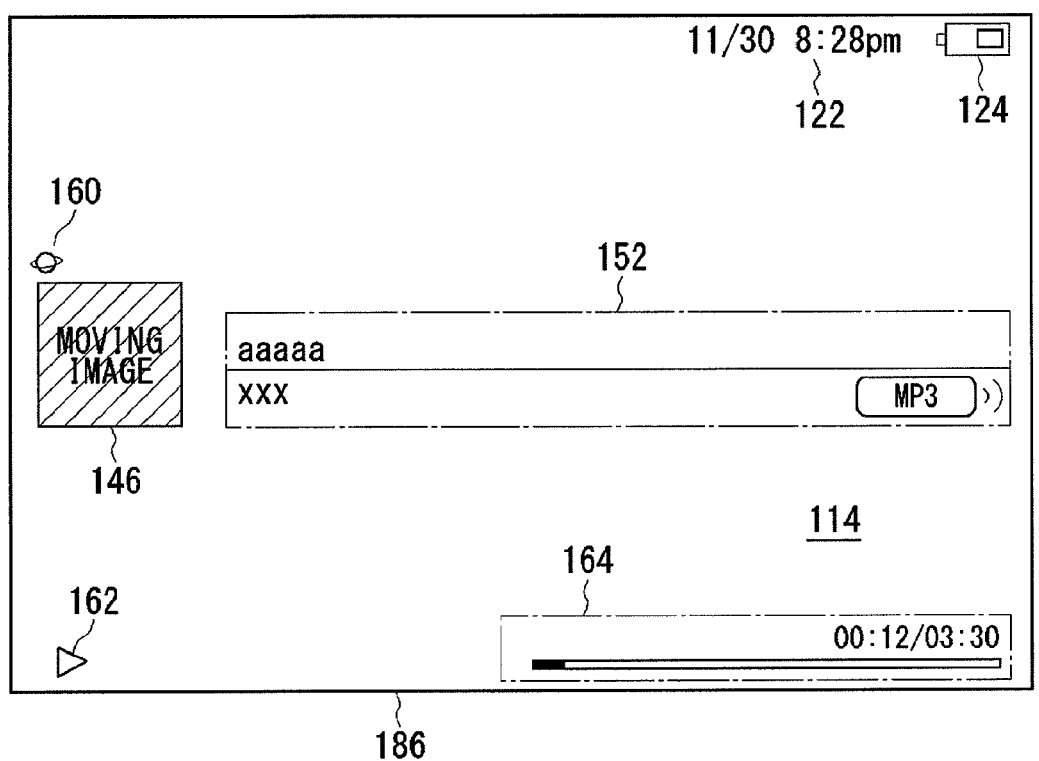
FIG. 6 is a diagram showing an example of a content reproduction screen.

Hereinafter, the displaying of the menu screen according to the present embodiment will be described with reference to the drawings. FIG. 3 shows an example of the highest level of the menu screen, or a menu screen which displays function icons and medium icons (hereinafter, this menu screen will sometimes be referred to as "medium level"). FIG. 4 shows an example of the menu screen when a plurality of folder icons are unfolded from a memory card icon (hereinafter, this menu screen will sometimes be referred to as "folder level"). FIG. 5 shows an example of the menu screen when a plurality of content icons are unfolded from a folder icon (hereinafter, this menu screen will sometimes be referred to as "content level"). FIG. 6 shows an example of a screen in which a content icon is selected and settled on to execute content operations such as reproducing and stopping the contents, editing content information, and deleting the contents (hereinafter, this screen will be referred to as "content reproduction screen"). With reference to FIGS. 3 to 6, a description will now be given of the menu screen and the content reproduction screen.

Referring to FIG. 3, the medium level 180 of the menu screen displays a plurality of function icons arranged in a horizontal direction, or a function icon array 52, and a plurality of item icons arranged in a vertical direction, or an item icon array, which intersect each other in a two-dimensional arrangement. The function icon array 52 includes a photograph reproducing function icon 58, a music reproducing function icon 60, a moving image reproducing function icon 62, and a game execution function icon 64 as icons that represent the types of reproducing functions of the multimedia reproducing apparatus 10. The medium icon array 54 includes such medium icons as a memory card icon 66 and a small optical disk icon 68. The medium level 180 of the menu screen, comprising the function icon array 52 and the medium icon array 54, is an on-screen display and is usually displayed as being overlaid on a background image so-called wallpaper. Nevertheless, it is sometimes displayed as being overlaid on a content reproduction image, for example.

The photograph reproducing function icon 58 is an icon to be selected when reproducing shot images stored in the small optical disk 70 or the memory card 72. In this instance, the images to be reproduced are still images mostly shot by a digital camera. The music reproducing function icon 60 is an icon to be selected when reproducing music data stored in the small optical disk 70 or the memory card 72. The following description will deal primarily with medium icons, folder icons, and content icons which are unfolded from the music reproducing function icon 60.

The moving image reproducing function icon 62 is an icon to be selected when reproducing moving images stored in the small optical disk 70 or in the memory card 72. The moving images to be reproduced are a motion picture or moving images captured by a digital camera, and are encoded using certain compression formats. The game execution function icon 64 is an icon to be selected when executing game programs. What is to be executed is game programs stored in the small optical disk 70 or the memory card 72.

The function icon that falls on an area 116 where the function icon array 52 and the medium icon array 54 intersect each other (hereinafter, referred to as "intersectional area") is the focus target currently selected by the user, and is somewhat enlarged and highlighted by coloring different from that of the other function icons. In FIG. 3, the music reproducing function icon 60 is highlighted as the focus target. The intersectional area 116 is fixed to a predetermined position on the menu screen. The entire function icon array 52 moves to the right or left in response to rightward or leftward instruction given from the user through the operation unit 40. A function icon that falls on the intersectional area 116 changes in color and icon size. The user can select desired reproducing functions simply by making direction instructions to the right or left.

The effect processor 108 moves the function icons to the right or left by scrolling the entire area of the function icon array 52 to the right or left. The effect processor 108 may display a plurality of function icons included in the function icon array 52 in a carousel fashion. In that case, the user can display all the function icons in the approximate center position of the menu screen 50 in succession simply by continuing giving instructions to either one direction, right or left. The effect processor 108 displays all the function icons in the same color and the same size while moving them to the right or left. When any one of the function icons falls on the intersectional area 116, the function icon is changed in color and size, and a function name such as "photo," "music," "movie," and "game" is displayed under the function icon. Since the function icon falling on the intersectional area 116 is displayed in a display mode different from that of the other function icons, the user can grasp the focus target intuitively.

The effect processor 108 does not display the medium icon array 54 if none of the function icons lies in the intersectional area 116 while the function icons are moving to the right or left. When any one of the function icons falls on the intersectional area 116, the medium icon array 54 is unfolded and displayed so as to extend vertically from below the intersectional area 116. The user can unfold and display medium icon array 54 corresponding to respective functions simply by scrolling the function icons to the right or left while focusing on the intersectional area 116. Conversely, if an instruction to the right or left is given when a medium icon array 54 is displayed, the effect processor 108 displays the unfolded medium icon array 54 with such a movement that it retracts into the intersectional area 116.

A focus area 142 is an area where the icon to be operated by the user shall be displayed. Its location is fixed to an approximate center position of the menu screen 50. The image generator 110 displays the medium icon array 54 so that the intersectional area 116 comes near this focus area 142, i.e., immediately above the focus area 142. The focus area 142 constitutes part of the medium icon array 54, and the effect processor 108 highlights the icon that lies in the focus area 142, such as the memory card icon 66 shown in FIG. 3. The highlighting may be effected by modifying the icon in such factors as brightness, saturation, and hue, or by blinking.

When the operation unit 40 is acquiring a user's instruction to the up or down, the individual medium icons move to the up or down according to the instruction. The effect processor 108 moves the medium icons to the up or down by scrolling the entire area of the medium icon array 54 up or down. The effect processor 108 may display the medium icons included in the medium icon array 54 in a carousel fashion. In that case, the user can display all the medium icons on the menu screen 50 in succession simply by continuing giving instructions to either one direction, being up or down.

When a medium icon falling on the focus area 142 is highlighted, attributes pertaining to the focused medium icon are displayed as a medium description display 120 in the vicinity of the icon such as on the right. In FIG. 3, a character string "memory card," which shows the name of the recording medium, and a character string "32 MB," which shows the capacity of the same, are displayed as the medium description display 120 to the right of the memory card icon 66 shown in the focus area. The medium description display 120 includes prepared text such as the name of the recording medium and detected information such as the capacity of the recording medium. The image generator 110 displays the function icon array 52 somewhat above the vertical center of the menu screen, and the medium icon array 54 somewhat to the left of the horizontal center of the menu screen. Consequently, the combination of the medium icon falling on the focus area 142 and the medium description display 120 is displayed in the approximate center position of the menu screen. The user can view the attributes of the recording medium in the center of the menu screen, and recognize the details of these easily.

A time display 122 and a remaining battery level display 124 are arranged in the upper area of the background image 114 as system information. The background image 114 is designed by contents creators, based on the premise that it is displayed as a background for the icons of the function icon array 52, the content icon array 140, and the like to be overlaid on.

A description will now be given of the folder level 182 of the menu screen in FIG. 4. When the operation unit 40 acquires an instruction that the memory card icon 66 is selected and settled on by the user, the effect processor 108 displays a folder icon 126 which represents a folder contained in the memory card in the position of the focus area 142. If a plurality of folders are contained in the memory card, a plurality of folder icons 126 are unfolded and displayed above and below the focus area 142, so that a vertically-extending folder icon array 130 is displayed. It should be appreciated that if contents are stored in the root directory of the memory card, content icons are displayed in the folder icon array 130 along with the folder icons. Before the operation unit 40 acquires the settled selection on the memory card icon 66, the memory card icon 66 is displayed in the focus area 142. When the operation unit 40 acquires the settled selection, the effect processor 108 therefore moves the memory card icon 66 to the left as much as one icon in order to clear the focus area 142. In this instance, the effect processor 108 moves the medium icon array 54 to the left as much as one icon so as to follow the leftward movement of the memory card icon 66.

The effect processor 108 highlights the folder icon 126 that falls on the focus area 142. When the operation unit 40 acquires an instruction to the up or down, the effect processor 108 moves the folder icon array 130 vertically according to the user instruction to the up or down, and highlights the folder icon 126 that falls on the focus area 142. Since the folder icon to be focused on is thus highlighted in a mode different from that of the other folder icons and is always located in the approximate center of the screen, it is possible to easily make the user focus on the one folder icon. A folder description display 132 is displayed on the right of the focus area 142. For a folder description, the folder description display 132 includes such information as the folder name and the number of files stored (in FIG. 4, being the number of tracks of sound data). For the other folder icons 126 which are not in the focus area 142, folder description displays 134 are similarly displayed to the right of the respective folder icons 126. The folder description display 132 of the folder falling on the focus area 142 and the folder description displays 134 of the other folders are preferably displayed in different text sizes, text colors, shading, tones, or the like so that the folder description display 132 is more noticeable. In FIG. 4, since the contents are sound data, the names of music albums, the names of singers, and the like are displayed as the folder description displays 132 and 134.

A description will now be given of the content level 184 of the menu screen in FIG. 5. When the operation unit 40 acquires an instruction that a folder icon 126 is selected and settled on by the user, the effect processor 108 displays a content icon 146 of contents stored in the corresponding folder in the position of the focus area 142. If a plurality of pieces of contents is stored in the folder, a plurality of content icons 148 is unfolded and displayed above and below the focus area 142, so that a vertically-extending content icon array 140 is displayed. It should be appreciated that if the folder corresponding to the folder icon 126 further contains subfolders, folder icons are also displayed in the content icon array 140 along with the content icons. Before the operation unit 40 acquires the settled selection on the folder icon 126, a folder icon 126 is displayed in the focus area 142. When the operation unit 40 acquires the settled selection, the effect processor 108 therefore moves the folder icon 126 to the left as much as one icon in order to clear the focus area 142. In this instance, the effect processor 108 moves the folder icon array 130 to the left as much as one icon so as to follow the leftward movement of the folder icon 126.

The content icon array 140 includes a content icon 146 in a moving image format and content icons 148 in a still image format. That is, the effect processor 108 highlights and displays the content icon 146 falling on the focus area 142 in the form of a moving image, and displays the content icons 148 lying in areas other than the focus area 142 in the form of still images. In the example shown in FIG. 5, the moving-image content icon 146 is displayed in the focus area 142, and two still-image content icons 148 are displayed in the other area. When the operation unit 40 acquires an instruction to the up or down, the effect processor 108 moves the content icon array 140 vertically according to the user instruction to the up or down, and highlights the content icon falling on the focus area 142 in the form of a moving image. As detailed above, since the content icon to be focused on is highlighted in a form different from that of the other content icons and is always located in the approximate center of the screen, it is possible to easily make the user focus on the one content icon. A content description display 152 is displayed to the right of the focus area 142. The content description display 152 includes such information as the content creation date, play time, data size, and data type. As shown in FIG. 4, content description displays 154 are also shown to the right of the respective other content icons 148 which are not in the focus area 142. The content description displays 152 and 154 are preferably displayed with different text sizes, text colors, shading, tones, or the like so that the content description display 152 is more noticeable. In FIG. 5, the names of songs, the names of singers, and the like are displayed as the content description displays 152 and 154 because the contents are music data. It should be appreciated that the content icons may be designed to be thumbnails of album images, or moving image data or thumbnails of promotion video clips of the songs.

FIG. 6 shows a content reproduction screen 186. When the operation unit 40 acquires an instruction that the contents falling on the focus area 142 are selected and settled on in the state shown in FIG. 5, the menu control unit 48 switches display from the content level 184 of the menu screen to the content reproduction screen 186. The effect processor 108 moves the content icon 146 to the left as much as one icon, and enlarges the content icon 146. In this instance, the folder icon array 130 is moved to the left to disappear from the screen.

The other content icons 148 are also eliminated from the screen. The content description display 152 is moved to the left as much as one icon so as to follow the content icon 146.

As described above, the content reproduction screen 186 is a screen for performing operations on the contents, such as giving a reproduction, stop, and other instructions to the contents, editing content information, and deleting the contents. When the operation unit 40 acquires a user instruction to reproduce the contents, the content controller 106 starts to reproduce the contents. In this instance, the effect processor 108 displays a reproduction indicator 160, which indicates that the contents are under reproduction, on the top left of the content icon 146. This reproduction indicator 160 may be either a still image or a moving image.

In the content reproduction screen 186, an indicator 162 for indicating that the contents are under reproduction, and a bar display 164 for showing the total play time and played time, are displayed on the background image 114.

The reproduction indicator 160 is displayed not only on the content reproduction screen but also in all the levels of the menu screen, i.e., all of the content level, the folder level, and the medium level while contents are under reproduction. In this respect, a description will be given with reference to FIGS. 7 to 11.

Figure 7:
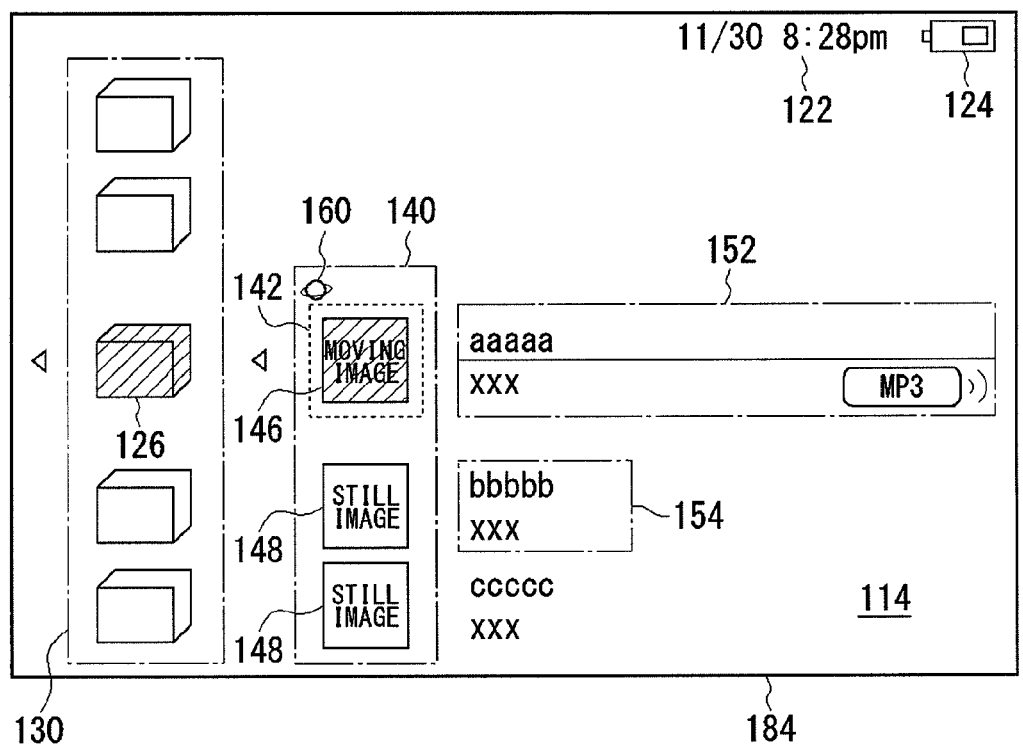
FIG. 7 is a diagram showing an example of the content level of the menu screen during reproduction of contents.

When the operation unit 40 acquires the depression of the home button 20 in the state shown in FIG. 6, the content level 184 of the menu screen is restored from the content reproduction screen 186 as shown in FIG. 7. In this instance, the content icon 146 is shrunk to the same size as that of the other content icons 148 which are not in the focus area 142, whereas the reproduction indicator 160 continues being displayed on the top left of the content icon 146.

Figure 8:
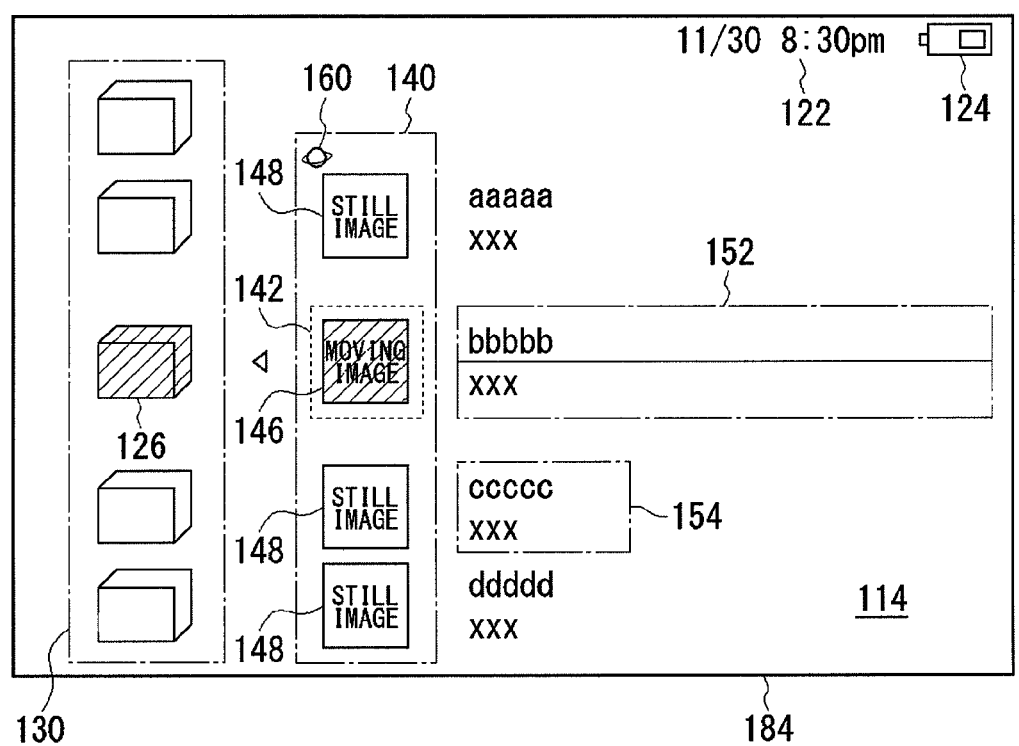
FIG. 8 is a diagram showing an example of the content level of the menu screen during the reproduction of the contents.

With reference to FIG. 8, when the operation unit 40 acquires an instruction to the up or down, the effect processor 108 moves the content icon array 140 vertically as described above. The content icon that has been in the focus area 142 is then moved upward as much as one icon and is no longer highlighted, and the content icon lying immediately below comes into the focus area 142 and is highlighted instead. Nevertheless, the reproduction indicator 160 continues being displayed on the top left of the content icon 148 that is reproduced at the time.

Figure 9:
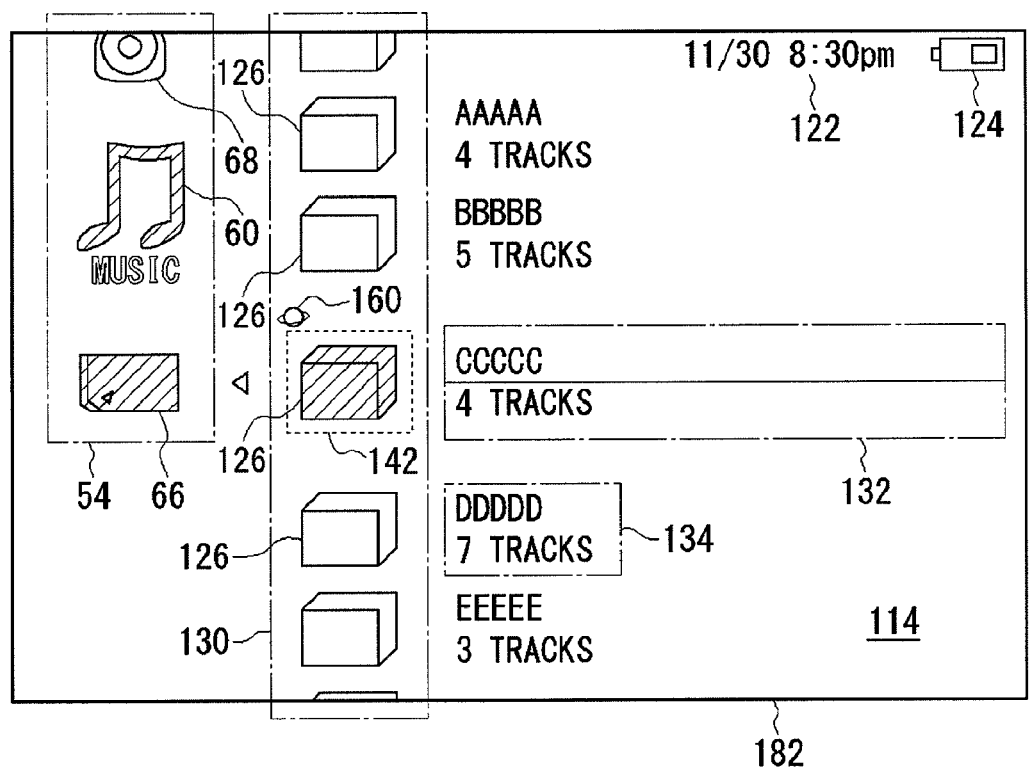
FIG. 9 is a diagram showing an example of a folder level of the menu screen during the reproduction of the contents.
Figure 10:
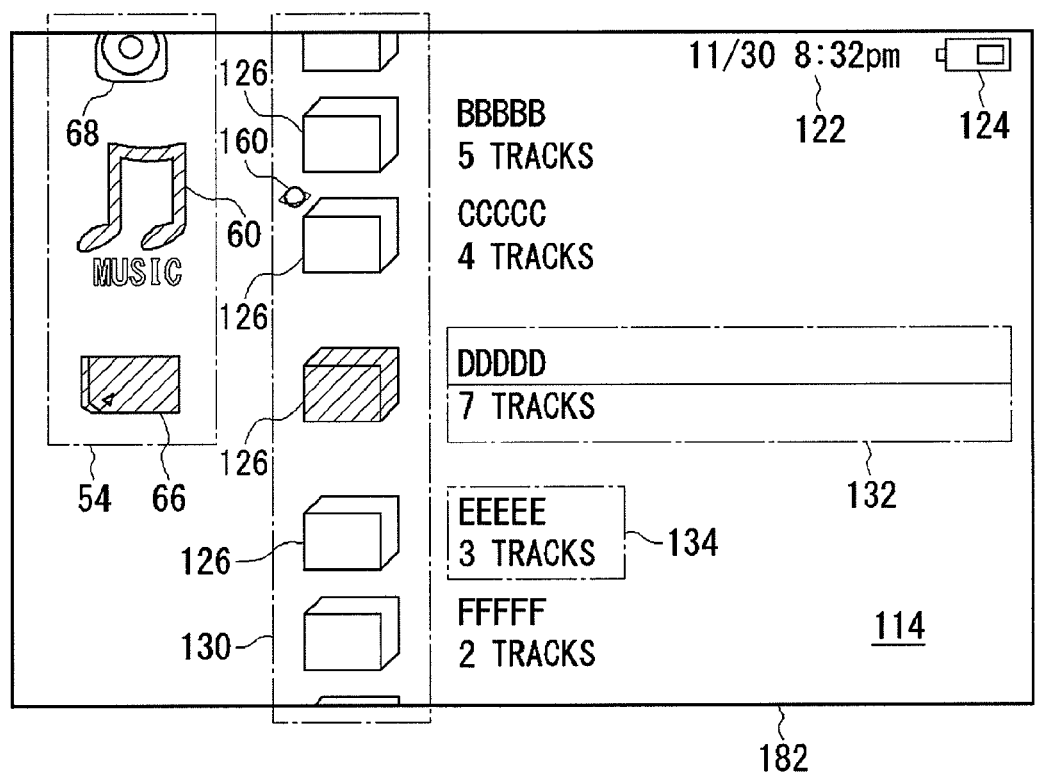
FIG. 10 is a diagram showing an example of the folder level of the menu screen during the reproduction of the contents.

Moreover, when the operation unit 40 acquires an instruction to move to an upper level of the menu screen, the screen switches from the content level 184 to the folder level 182 of the menu screen as shown in FIG. 9. In this instance, the unfolded content icons 146 and 148 are eliminated from the screen with such a movement that they retract into the folder icon 126, and the folder icon array 130 is moved to the right as much as one icon. When the content icon corresponding to the contents under reproduction thus disappears from the screen, the effect processor 108 displays the reproduction indicator 160 on the top left of the folder icon 126 that contains the content icon. When the folder icon array 130 is moved in vertical directions, the reproduction indicator 160 also continues being displayed on the top left of the folder icon 126 of the folder that contains the contents under reproduction (see FIG. 10). In this way, even if the focus area 142 is shifted to another folder or if content icons in other folders are displayed, the reproduction indicator 160 continues being displayed on the top left of the folder icon that contains the contents under reproduction.

Figure 11:
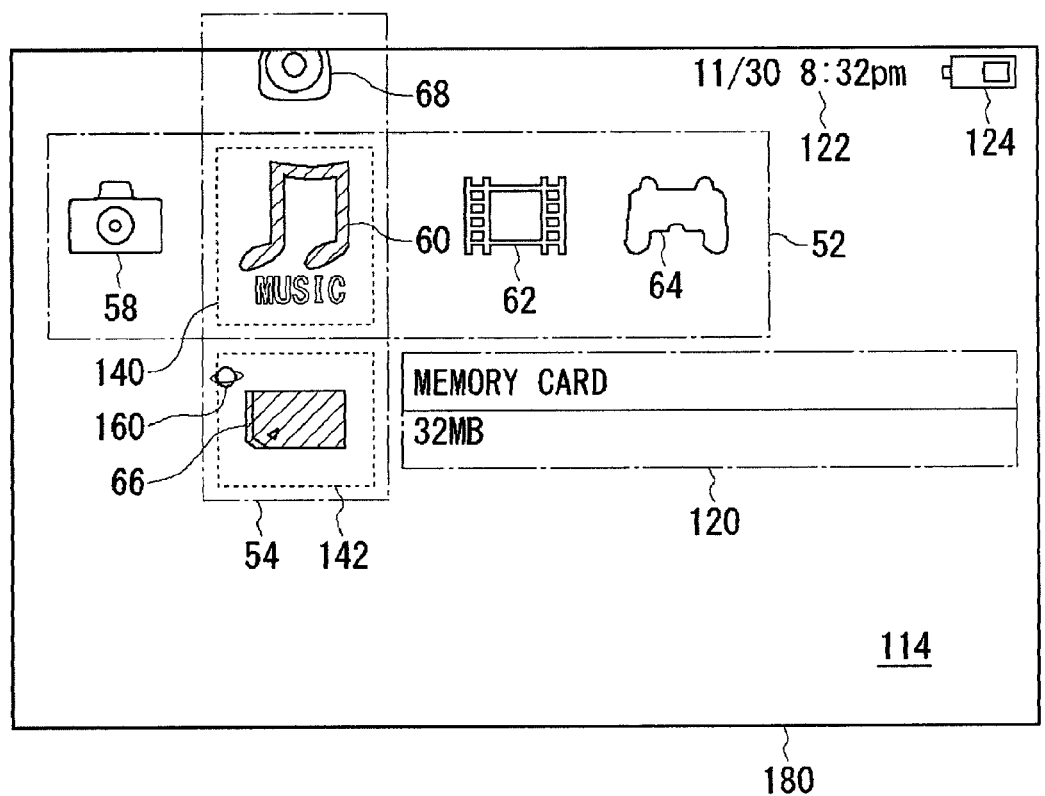
FIG. 11 is a diagram showing an example of a medium level of the menu screen during the reproduction of the contents.

Furthermore, when the operation unit 40 acquires an instruction to move to an upper level of the menu screen, the screen switches from the folder level 182 to the medium level 180 of the menu screen as shown in FIG. 11. In this instance, the unfolded folder icons 126 are eliminated from the screen with such a movement that they retract into the memory card icon 66, and the medium icon array 54 is moved to the right as much as one icon. When the folder icon 126 accompanied with the reproduction indicator 160 thus disappears from the screen, the effect processor 108 displays the reproduction indicator 160 on the top left of the medium icon that contains the folder icon 126. As a result, the reproduction indicator 160 is displayed on the medium that contains the contents under reproduction.

As detailed above, the multimedia reproducing apparatus 10 displays a screen comprising the function icon array, the medium icon array, the folder icon array, and/or the content icon array for each level of the menu screen. Both the function icon array 52 and the medium icon array 54 to be initially displayed on the medium level 180 are in a line, and various icons are displayed in turn as a result of scrolling up, down, to the right, and to the left. This can provide the user with the sense that a large number of pieces of contents are arranged in a matrix across the entire screen. The user can select contents as if moving the matrix of a large number of contents freely and focusing onto desired contents. Note that the numbers of icons to be actually displayed on-screen are small, and the user never feels that the screen is two complicated. This is particularly advantageous for displaying on a relatively small liquid crystal screen. The user can select contents in succession simply by instructing directions to the up, down, right, or left, and can thus make so-called zapping actions with a simple and comfortable operation. Since the focus area 142 is always located in the approximate center of the menu screen, the user can select contents with the sense of as if looking into a window formed in the center of the menu screen showing desired contents. This eliminates the need to take the trouble of looking for the focus area 142 within the menu screen, and can thus provide the user with an environment where operations can be made in a more relaxed fashion.

Conventionally, the highlighting of content icons during reproduction has been performed. However, it has been impossible to identify which folder the contents under reproduction are contained in when moving to upper folders. According to the present embodiment, the reproduction indicator is displayed not only on the content icon that corresponds to the contents under reproduction, but also in upper levels which include the contents. The user can thus easily recognize the location in the directory where the contents being reproduced by the multimedia reproducing apparatus 10 is contained. This makes it possible to search for the contents under reproduction even when browsing a complicated content list of a multilevel configuration. It should be appreciated that the reproduction indicator may have any shape, coloring, actions, and the like. Moreover, the display position of the reproduction indicator is not limited to the top left of the icons. The reproduction indicator may be at any position as long as located near the icons. The reproduction indicator may also be displayed so as to overlap the icons.

In another embodiment, the reproduction indicator need not be displayed near the icons. Instead, the content icon corresponding to contents under reproduction, the folder icon of a folder that contains the contents under reproduction, or the medium icon of a medium that contains the contents under reproduction (here, these three will be referred to collectively as "playing icons") may be displayed in a mode different from that of the other icons. For example, the effect processor 108 may display the playing icons with brightness, saturation, hue, and the like that is different from those of the highlighted icon in the focus area. The playing icons may also be displayed in a size different from that of the other icons. Moreover, the effect processor 108 may display the playing content icon as a moving image icon, not a still image icon. This moving image icon is preferably designed differently from the way that content icon in the focus area is. Furthermore, the effect processor 108 may blink, rotate, or vibrate the playing icons themselves for display.

Figure 12:
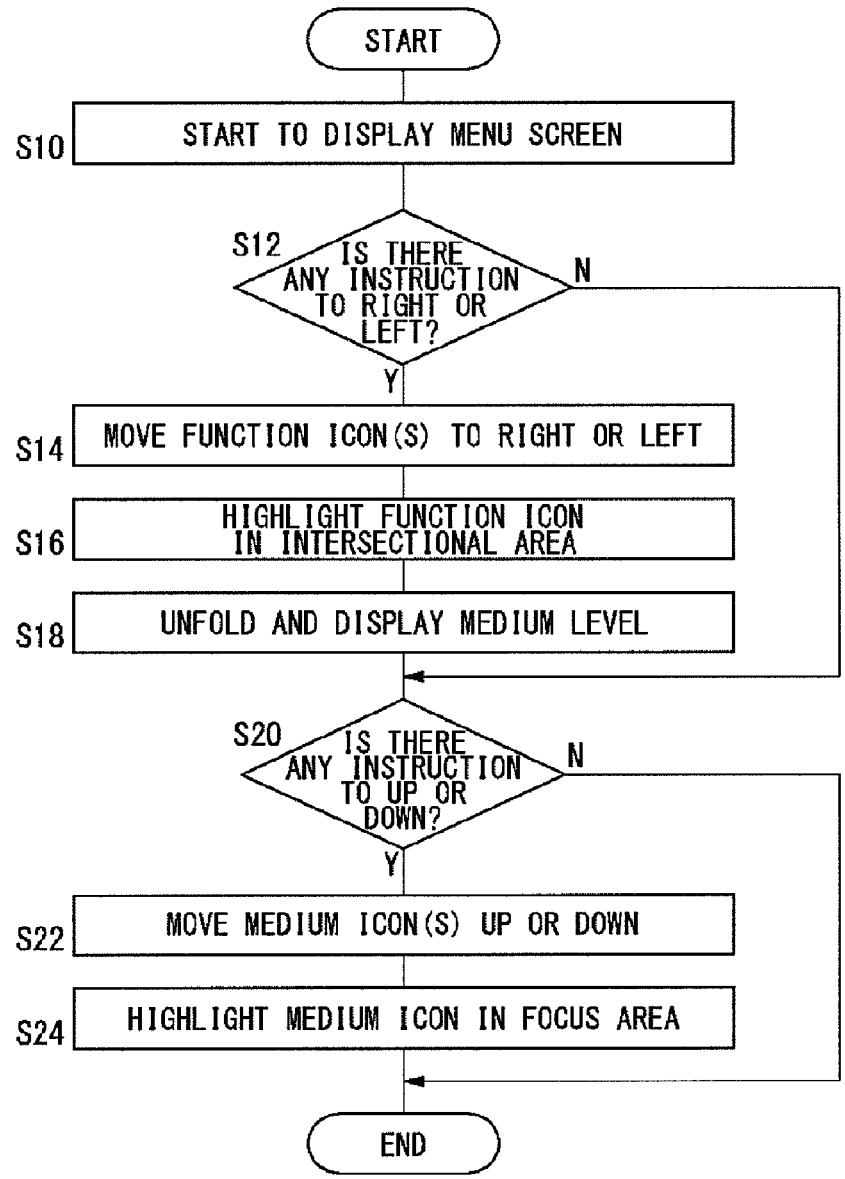
FIG. 12 is a flowchart showing the process of displaying the menu screen in the multimedia reproducing apparatus.

FIG. 12 is a flowchart showing the process of displaying a menu screen in the multimedia reproducing apparatus. When the user turns on the power of the multimedia reproducing apparatus 10, the image generator 110 reads data such as function icons and medium icons from the storage unit 80, and generates a menu screen. The display unit 30 displays it on the liquid crystal display 12 (S10). If the operation unit 40 acquires a user's direction instruction either to the right or to the left (Y at S12), the effect processor 108 moves the function icons either to the right or to the left in accordance with the instruction (S14). The effect processor 108 highlights a function icon that falls on the intersectional area 116 (S16), reads from the storage unit 80 the medium icons of recording media in which contents corresponding to that function are stored, and unfolds and displays the same in vertical directions (S18). When there is no user instruction to the right or left, S14 to S18 are skipped (N at S12).

If the operation unit 40 acquires a user's direction instruction either to up or down in the state where medium icons are unfolded (Y at S20), the effect processor 108 moves the medium icons either up or down in accordance with the instruction (S22). The effect processor 108 highlights a medium icon that falls on the focus area 142 (S24). When there is no user instruction to up or down at S20 (N at S20), S22 and S24 are skipped.

Figure 13:
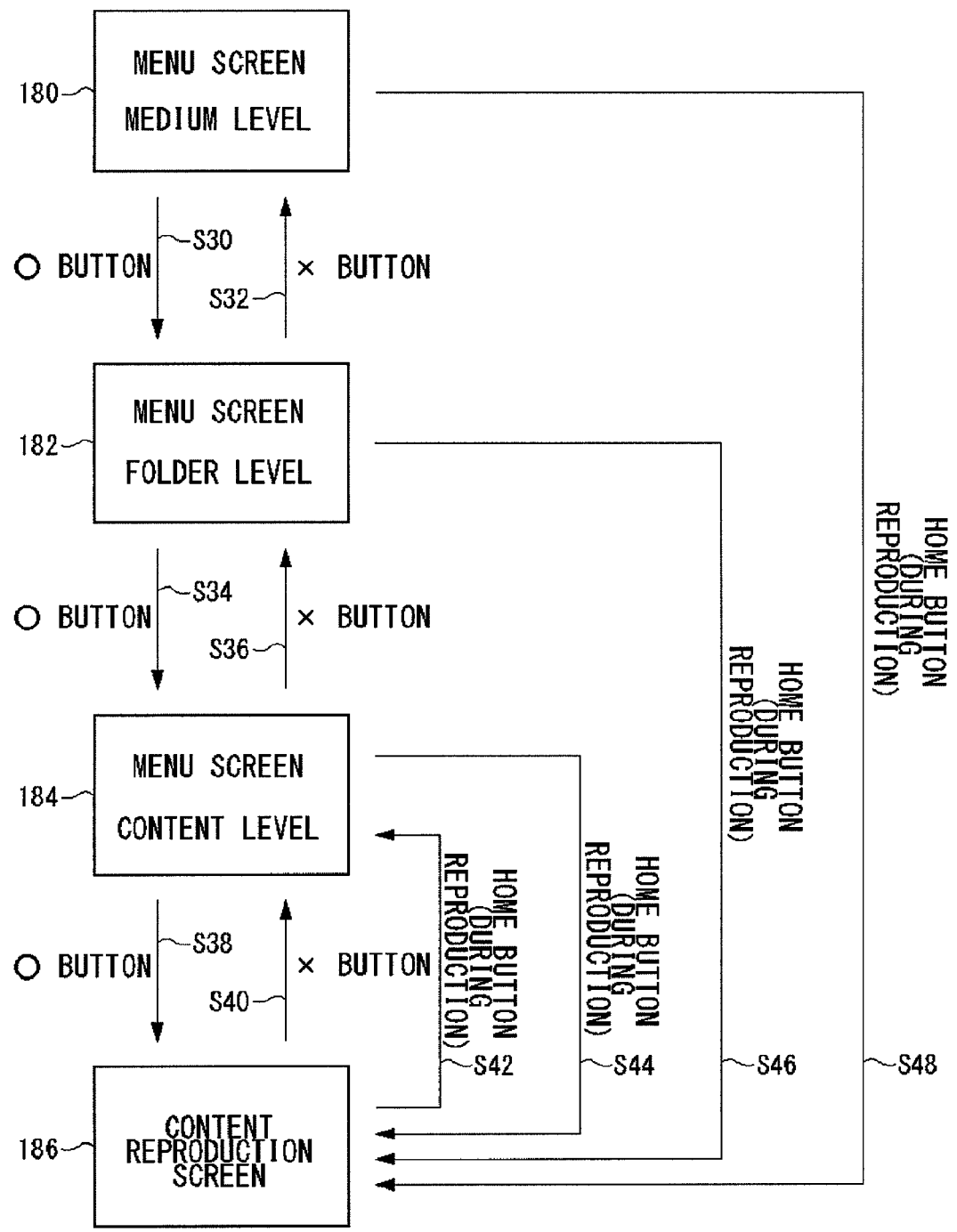
FIG. 13 is a state transition diagram showing the switching between the individual levels of the menu screen and the content reproduction screen in the multimedia reproducing apparatus.

FIG. 13 is a state transition diagram showing the switching between the individual levels of the menu screen and the content reproduction screen in the multimedia reproducing apparatus. In this embodiment, a description will now be given on the assumption that the user operates the circle button 18a in order to settle a selection, and operates the cross button 18b in order to cancel a selection. If the operation unit 40 detects the depression of the circle button 18a while the medium level 180 of the menu screen is displayed, the folder level 182 of the menu screen is displayed on the multimedia reproducing apparatus 10 (S30). If the operation unit 40 detects the depression of the circle button 18a again, the content level 184 of the menu screen is displayed on the multimedia reproducing apparatus 10 (S34). In this state, if the user operates the arrow keys 14 to select a content icon and presses the circle button 18a, the content reproduction screen 186 is displayed on the multimedia reproducing apparatus 10 (S38).

If the operation unit 40 detects the depression of the cross button 18b during the reproduction of contents, the content controller 106 stops the reproduction of the contents and the screen display is switched from the content reproduction screen 186 to the content level 184 of the menu screen (S40). If the operation unit 40 detects the depression of the cross button 18b while the content level 184 of the menu screen is displayed, the folder level 182 of the menu screen is displayed on the multimedia reproducing apparatus 10 (S36). If the operation unit 40 detects the depression of the cross button 18b again, the medium level 180 of the menu screen is displayed on the multimedia reproducing apparatus 10 (S32).

If the operation unit 40 detects the depression of the home button 20 during the reproduction of the contents, the screen display is switched to the content level 184 of the menu screen while the contents continue being reproduced (S42). If the operation unit 40 detects the depression of the home button 20 again in this state, i.e., when the contents are under reproduction and the content level 184 is displayed, then the content reproduction screen 186 is restored (S44). In this way, the content reproduction screen 186 and the content level 184 of the menu screen can be displayed alternately each time the home button 20 is depressed.

Moreover, if the operation unit 40 detects the depression of the home button 20 while the contents are under reproduction and the folder level of the menu screen is displayed or the medium level is displayed, then the content reproduction screen 186 is displayed on the multimedia reproducing apparatus 10 (S46, S48). As above, when contents are under reproduction, the content reproduction screen is displayed immediately by a single depression of the home button 20 regardless of which level of the menu screen is displayed.

In conventional multimedia reproducing apparatuses, the operation necessary for displaying a menu screen during the reproduction of contents is different from the operation necessary for going back to a content reproduction screen. It has therefore been difficult to operate intuitively. According to the present invention, the content level of the menu screen and the content reproduction screen can be displayed alternately by pressing one home button. This can avoid the user's confusion in operation. Furthermore, no matter which level of the menu screen of multilevel configuration is displayed, the home button can be pressed to enter the content reproduction screen immediately for improved operability.

Up to this point, the present invention has been described in conjunction with the embodiment thereof. This embodiment is given only by way of illustration. It will be understood by those skilled in the art that various modifications may be made to combinations of the foregoing components and processes, and all such modifications are also intended to fall within the scope of the present invention. Hereinafter, modifications will be described.

While the foregoing embodiment has dealt with music data representatively, the same interface can also be applied to the reproduction of video data and the reproduction of digital photographs.

The foregoing embodiment has dealt with the configuration where medium icons and function icons are moved to the left when content icons are unfolded for display. Nevertheless, in some possible configurations, medium icons and function icons need not be moved to the left, and content icons may be substituted in the positions of the medium icons displayed so far.

When switching from the content level of the menu screen to the content reproduction screen, display effects may be applied to give the feeling of seamless transition. More specifically, the effect processor 108 may display a content icon with a gradual increase in size while moving the content icon to the left to shift from the state of FIG. 5 to the state of FIG. 6. This makes the user visually sense that the contents are selected and settled. If an instruction to stop the reproduction of the contents is given on the content reproduction screen, the effect processor 108 may display the content icon with a gradual decrease in size in a reverse fashion from the foregoing while moving the content icon to the right when the content icon is restored from the state of FIG. 6 to the state of FIG. 5.

The embodiment has dealt with the case of a portable hybrid apparatus, whereas digital apparatuses of non-portable types may be practiced in modifications. Personal computers and other apparatuses may also be used.

INDUSTRIAL APPLICABILITY

According to the present invention, it is possible to improve the user's convenience in an interface for giving an instruction for multimedia reproduction.

What is claimed is:

1. A multimedia reproducing apparatus capable of reproducing digital contents, comprising:
    an operation unit which acquires a user's instruction pertaining to reproduction of contents;
    a search unit which searches an external recording medium loaded in the apparatus for data necessary for constituting a menu screen for searching for contents; and
    a menu control unit which displays a reproduction indicator near a content icon that corresponds to content being reproduced by the apparatus when the content is reproduced in the apparatus, the reproduction indicator indicating that the content is under reproduction;
    wherein the menu control unit displays, when the icon having the reproduction indicator disappears from the screen is eliminated from the screen with such a movement that the icon retracts into an icon of the upper level in response to a user's instruction, the reproduction indicator near the icon of the upper level, and
    wherein the menu control unit selects, when icons of the lower level are unfold and displayed from the icon having the reproduction indicator, an icon corresponding to the content under reproduction from icons of the lower level and displays the reproduction indicator near the selected icon accordingly.

2. A multimedia reproducing apparatus according to claim 1, wherein the menu control unit
    switches between and displays a first level menu screen, a second level menu screen and a third level menu screen according to a user's selection, the first level menu screen displaying a folder icon and a content icon corresponding to content unfolded from that folder, the second level menu screen displaying a folder icon in the state that content is contained in a folder, the third level menu screen displaying a medium icon in the state that a folder is contained in the medium icon, the medium icon representing types of external recording media capable of being loaded into the apparatus; and
    displays the reproduction indicator near the icon associated with the content under reproduction in each of the level menu screens.

3. A multimedia reproducing apparatus according to claim 2, wherein the menu control unit displays a content reproduction screen when an instruction to reproduce contents is given from the user,
    the apparatus further comprising a switching unit which makes the first level menu screen displayed according to an instruction from the user when the content reproduction screen is displayed, and makes the content reproduction screen displayed according to an instruction from the user when the first level menu screen is displayed.

4. A multimedia reproducing apparatus according to claim 3, wherein the switching unit makes the content reproduction screen displayed according to an instruction from the user when the second level menu screen or the third level menu screen is displayed.

5. A menu screen display method of making an apparatus capable of reproducing digital contents display a menu screen for searching for contents, the method comprising:
    searching an external recording medium loaded in the apparatus for data necessary for constituting the menu screen;
    displaying a reproduction indicator near a content icon that corresponds to content being reproduced by the apparatus when the content is reproduced in the apparatus, the reproduction indicator indicating that the content is under reproduction;
    displaying, when the icon having the reproduction indicator disappears from the screen is eliminated from the screen with such a movement that the icon retracts into an icon of the upper level in response to a user's instruction, the reproduction indicator near the icon of the upper level; and
    selecting, when icons of the lower level are unfold and displayed from the icon having the reproduction indicator, an icon corresponding to the content under reproduction from icons of the lower level and displays the reproduction indicator near the selected icon accordingly.

6. A menu screen display method according to claim 5, further comprising:
    switching between and displaying a first level menu screen, a second level menu screen and a third level menu screen according to a user's selection, the first level menu screen displaying a folder icon and a content icon corresponding to content unfolded from that folder, the second level menu screen displaying a folder icon in the state that content is contained in a folder, the third level menu screen displaying a medium icon in the state that a folder is contained in the medium icon, the medium icon representing types of external recording media capable of being loaded into the apparatus; and
    displaying the reproduction indicator near the icon associated with the content under reproduction in each of the level menu screens.

7. A menu screen display method according to claim 6, further comprising:
    displaying a content reproduction screen when an instruction to reproduce contents is given from the user;
    displaying the first level menu screen according to an instruction given from the user by using a switching unit provided on the apparatus when the content reproduction screen is displayed; and
    displaying the content reproduction screen according to an instruction given from the user by using the switching unit when the first level menu screen is displayed.

8. A menu screen display method according to claim 7, further comprising displaying the content reproduction screen according to an instruction given from the user by using the switching unit when the second level menu screen or the third level menu screen is displayed.

9. A computer-readable recording medium containing a computer program causing an apparatus capable of reproducing digital contents to display a menu screen for searching for contents, the program comprising the functions of:
    searching an external recording medium loaded in the apparatus for data necessary for constituting the menu screen;
    displaying a reproduction indicator near a content icon that corresponds to content being reproduced by the apparatus when the content is reproduced in the apparatus, the reproduction indicator indicating that the content is under reproduction;
    displaying, when the icon having the reproduction indicator disappears from the screen is eliminated from the screen with such a movement that the icon retracts into an icon of the upper level in response to a user's instruction, the reproduction indicator near the icon of the upper level; and selecting, when icons of the lower level are unfold and displayed from the icon having the reproduction indicator, an icon corresponding to the content under reproduction from icons of the lower level and displays the reproduction indicator near the selected icon accordingly.

10. A computer-readable recording medium according to claim 9, the program further comprising the functions of:

switching between and displaying a first level menu screen, a second level menu screen and a third level menu screen according to a user's selection, the first level menu screen displaying a folder icon and a content icon corresponding to content unfolded from that folder, the second level menu screen displaying a folder icon in the state that content is contained in a folder, the third level menu screen displaying a medium icon in the state that a folder is contained in the medium icon, the medium icon representing types of external recording media capable of being loaded into the apparatus; and displaying the reproduction indicator near the icon associated with the content under reproduction in each of the level menu screens.

11. A computer-readable recording medium according to claim 10, the computer program further comprising the functions of:

displaying a content reproduction screen when an instruction to reproduce contents is given from the user;

displaying the first level menu screen according to an instruction given from the user by using a switching unit provided on the apparatus when the content reproduction screen is displayed; and displaying the content reproduction screen according to an instruction given from the user by using the switching unit when the first level menu screen is displayed.

12. A computer-readable recording medium according to claim 11, the computer program further comprising the function of displaying the content reproduction screen according to an instruction given from the user by using the switching unit when the second level menu screen or the third level menu screen is displayed.

* * * * *